(12) United States Patent
Okasaka (10) Patent No.: US 7,532,814 B2
(45) Date of Patent: May 12, 2009

(54) ELECTRONIC CAMERA (75) Inventor: Akira Okasaka, Osaka (JP)

(73) Assignee: Sanyo Electric Co., Ltd., Moriguchi-shi (JP)

( * ) Notice: Subject to any disclaimer, the term of this patent is extended or adjusted under 35 U.S.C. 154(b) by 371 days.

(21) Appl. No.: 10/583,601

(22) PCT Filed: Dec. 20, 2004

(86) PCT No.: PCT/JP2004/019496

§ 371 (c)(1),
(2), (4) Date: Jun. 20, 2006

(87) PCT Pub. No.: WO2005/064923

PCT Pub. Date: Jul. 14, 2005

(65) Prior Publication Data

US 2007/0165132 A1 Jul. 19, 2007

(30) Foreign Application Priority Data

Dec. 26, 2003 (JP) ............................. 2003-431750

(51) Int. Cl.
G03B 7/00 (2006.01)
(52) U.S. Cl. .................. 396/213; 396/187; 396/215; 348/221.1; 348/229.1; 348/362
(58) Field of Classification Search ............... 348/362, 348/221.1, 229.1, 222.1; 396/213–214, 234, 396/64, 65, 161, 166, 167, 180, 187, 215
See application file for complete search history.

(56) References Cited

U.S. PATENT DOCUMENTS 5,512,947 A * 4/1996 Sawachi et al. ............. 348/243
6,157,407 A * 12/2000 Kobayashi ................. 348/241
6,163,342 A * 12/2000 Suzuki ...................... 348/364
6,747,704 B1 * 6/2004 Kitamura ................... 348/363
6,768,511 B1 * 7/2004 Nakai et al. ............. 348/229.1

(Continued)

FOREIGN PATENT DOCUMENTS

JP  8-336070 A  12/1996

(Continued)

OTHER PUBLICATIONS

International Search Report mailed Apr. 26, 2005 of International Application PCT/JP2004/019496.

Primary Examiner—W.B. Perkey
Assistant Examiner—Linda B Smith
(74) Attorney, Agent, or Firm—Westerman, Hattori, Daniels & Adrian, LLP.

(57) ABSTRACT

A digital camera (10) includes a CCD imager (16). An image signal corresponding to an optical image is output from the CCD imager (16), and an incident light amount to the CCD imager (16) is restricted by an aperture unit (14). A CPU (40) adjusts an exposure time period of the CCD imager (16) on the basis of an average luminance value of a normal evaluation area assigned to the center of a screen out of the image signals output form the CCD imager (16). The CPU (40) also adjusts an aperture amount of the aperture unit (14) on the basis of an average luminance value of a specific evaluation area assigned to the end of the screen out of the image signals output form the CCD imager (16).

7 Claims, 6 Drawing Sheets

U.S. PATENT DOCUMENTS

| | | |
|---|---|---|
| 6,982,705 B2 * | 1/2006 | Kunimi et al. .............. 345/204 |
| 2002/0140844 A1 | 10/2002 | Kurokawa et al. |
| 2005/0007487 A1 * | 1/2005 | Miyoshi et al. ............. 348/362 |

FOREIGN PATENT DOCUMENTS

| JP | 2000-278613 A | 10/2000 |
|---|---|---|
| JP | 2003-18468 A | 1/2003 |
| JP | 2003-92705 A | 3/2003 |

* cited by examiner

ELECTRONIC CAMERA

TECHNICAL FIELD

The present invention relates to an electronic camera which is applied to a digital camera. More specifically, the present invention relates to an electronic camera which clamps an image signal output from an image sensor.

PRIOR ART

As to a digital camera, in general, when a shutter button is operated, a CCD imager is pre-exposed, and an image signal thus generated is subjected to a clamping process during an optical black period. The luminance of an object image is evaluated on the basis of the image signal on which the clamping process is performed, and whereby, a primary exposure amount is thus set to an optimum value.

However, when a high luminance light is irradiated onto the CCD imager, an electric charge flows into an optical black area by blooming, resulting in a variation of an optical black level. Thus, in a prior art in which a clamping process is performed during the optical black period, it was impossible to properly evaluate the luminance of the object image.

Here, a conventional digital camera in which a primary exposure amount can be properly adjusted even if a high luminance light is incident is disclosed in Japanese Patent Laying-open No. 2000-278613 laid-open on Oct. 6, 2000. In the prior art, when a shutter button is depressed, a luminance evaluating value is obtained as to an image signal which is generated by a first pre-exposure and clamped during an optical black period, and a luminance evaluating value as to an image signal which is generated by a second pre-exposure and clamped during an idle feed period is further obtained.

Then, in the first embodiment, an exposure amount is adjusted on the basis of a difference between the respective luminance evaluating values, and in the second embodiment, a clamp period is set to any one of the optical black period and the idle feed period on the basis of a difference between the respective luminance evaluating values.

Consequently, in the first embodiment, it is possible to prevent blooming on an image signal obtained by the last pre-exposure from occurring, and in the second embodiment, it is possible to prevent a clamping level of the image signal obtained by the last pre-exposure from varying. The exposure amount for the primary exposure can be accurately calculated on the basis of such an image signal.

SUMMARY OF THE INVENTION

However, in a normal digital camera, before a shutter button is operated, that is, when a primary exposure or a pre-exposure is not performed, image signals are periodically generated by a CCD imager, and a through-image based thereon is displayed on a monitor screen.

However, in the above-described prior art in which a clamping process is performed during the optical black period and the idle feed period, in a case of occurrence of blooming, since this is detected only when a shutter operation is performed, and an exposure amount adjustment or a clamp timing control is executed after the detection, it is impossible to prevent saturation from occurring on the through-image before the shutter operation.

Therefore, it is a primary object of the present invention to provide a novel electronic camera.

Another object of the present invention is to provide an electronic camera capable of performing a precise clamping process on an image signal even when a high luminance object enters the end of a screen.

An electronic camera according to an invention of claim 1 comprises an imaging device for outputting an image signal corresponding to an optical image, an aperture member for restricting an incident light amount to the imaging device, a first adjustment means for adjusting an exposure time period of the imaging device on the basis of a first part image signal belonging to a first part area assigned to a center of a screen out of the image signals output from the imaging device, and a second adjustment means for adjusting an aperture amount of the aperture member on the basis of a second part image signal belonging to a second part area assigned to an end of the screen out of the image signals output from the imaging device.

According to an invention of claim 1, an image signal corresponding to an optical image is output from an imaging device, and an incident light amount to the imaging device is controlled by an aperture member. A first adjustment means adjusts an exposure time period of the imaging device on the basis of a first part image signal belonging to a first part area assigned to a center of a screen out of the image signals output from the imaging device. A second adjustment means adjusts an aperture amount of the aperture member on the basis of a second part image signal belonging to a second part area assigned to an end of the screen out of the image signals output from the imaging device.

According to an invention of claim 1, an exposure time period is adjusted on the basis of the image signal at the center of the screen, and therefore, it is possible to perform photographing at an adequate exposure amount depending on brightness of a main object. Furthermore, when a high luminance light is irradiated on the end of the screen, an incident light amount to the imaging device, especially, an incident light amount to the end of the screen is restricted by contracting the aperture member, and as a result, it is possible to prevent a leakage charge from flowing into the clamp area placed on the periphery of the screen, capable of performing an adequate clamping process.

It should be noted that when the aperture member is contracted, the screen naturally becomes dark, but the luminance at the center of the screen is less lowered than that at the end of the screen. By focusing attention on this point, in the invention according to claim 1, changes of the brightness of the main object is addressed by adjusting the exposure time period, and entry of a high luminance object to the end of the object scene is addressed by adjusting the aperture amount. Due to this, it is possible to perform both of an adequate exposure amount control depending on the brightness of the main object and a luminance control of an incident light to the end of the screen.

An electronic camera according to an invention of claim 2 is dependent on claim 1, and the imaging device periodically outputs the image signals, the first adjustment means adjusts a next exposure time period on the basis of the first part image signal included in the image signals currently output from the imaging device, and the second adjustment means adjusts a next aperture amount on the basis of the second part image signal included in the image signals currently output from the imaging device.

According to an invention of claim 2, when photographing a motion image, or when photographing a still image by a pre-exposure and a primary exposure, it is possible to perform an adequate exposure amount control depending on the brightness of the main object, and perform an adequate clamping process when a high luminance object enters the end of the screen.

An electronic camera according to an invention of claim 3 is depending on claim 1 or 2, and further comprises an evaluation means for evaluating brightness of the end of the screen on the basis of the second part image signal, and the second adjustment means includes a comparison means for comparing an evaluated value obtained by the evaluation means with a threshold value, and an adjustment execution means for adjusting an aperture amount on the basis of a comparison result of the comparison means.

According to an invention of claim 3, an evaluation means evaluates brightness of the end of the screen on the basis of the second part image signal. A second adjustment means includes a comparison means and an adjustment execution means, and the comparison means compares an evaluated value obtained by the evaluation means with a threshold value, and the adjustment execution means adjusts the aperture amount on the basis of a comparison result of the comparison means.

An electronic camera according to an invention of claim 4 is dependent on claim 3, and the aperture amount indicates any one of a first amount and a second amount having a restricted amount larger than that of the first amount, the comparison means includes a first determination means for determining whether or not the evaluated value is above a first threshold value when the aperture amount is the first amount, and a second determination means for determining whether or not the evaluated value is below a second threshold value smaller than the first threshold value when the aperture amount is the second amount, and the adjustment execution means includes a second amount setting means for setting the aperture amount to the second amount when a determination result by the first determination means is affirmative, and a first amount setting means for setting the aperture amount to the first amount when the determination result by the second determination means is affirmative.

According to an invention of claim 4, an aperture amount indicates any one of a first amount and a second amount. The second amount has a restricted amount larger than that of the first amount. The comparison means includes a first determination means and a second determination means, and the first determination means determines whether or not the evaluated value is above a first threshold value when the aperture amount is the first amount, and the second determination means determines whether or not the evaluated value is below a second threshold value smaller than the first threshold value when the aperture amount is the second amount. The adjustment execution means includes a second amount setting means and a first amount setting means, and the second amount setting means sets the aperture amount to the second amount when a determination result by the first determination means is affirmative, and the first amount setting means sets the aperture amount to the first amount when the determination result by the second determination means is affirmative. That is, if the evaluated value is above the first threshold value when the aperture amount is the first amount, the aperture amount is increased from the first amount to the second amount, and if the evaluated value is below the second threshold value when the aperture amount is the second amount, the aperture amount is decreased from the second amount to the first amount.

According to an invention of claims 3 and 4, it is possible to easily perform adjustment of the aperture amount on the basis of the evaluated value.

An electronic camera according to an invention of claim 5 is dependent on any one of claims 1 to 4, and the imaging device has an imaging surface on which an optical black area and an effective area are provided, and the end of the screen is a portion placed on the effective area and adjacent to the optical black area.

An electronic camera according to an invention of claim 6 is dependent on claim 5, and further comprises a clamp means for performing a clamping process on the image signal output from the imaging device at a timing corresponding to the optical black area.

According to an invention of claim 6, the image signal output from the imaging device is subjected to a clamping process by the clamp means at a timing corresponding to the optical black area.

According to an invention of claims 5 and 6, only the area adjacent to the optical black area (clamp area) corresponding to the optical black period during which a clamping process is performed can be an object of a brightness evaluation, and therefore, it is possible to efficiently perform an aperture amount control.

An exposure control program according to an invention of claim 7 is an exposure control program which is executed by a processor of an electronic camera having an imaging device outputting an image signal corresponding to an optical image and an aperture member restricting an incident light amount to the imaging device includes a first adjusting step for adjusting an exposure time period of the imaging device on the basis of a first part image signal belonging to a first part area assigned to a center of a screen out of the image signals output from the imaging device, and a second adjusting step for adjusting an aperture amount of the aperture member on the basis of a second part image signal belonging to a second part area assigned to an end of the screen out of the image signals output from the imaging device.

An exposure control method according to an invention of claim 8 is an exposure control method which is executed by an electronic camera having an imaging device outputting an image signal corresponding to an optical image and an aperture member restricting an incident light amount to the imaging device includes a first adjusting step for adjusting an exposure time period of the imaging device on the basis of a first part image signal belonging to a first part area assigned to a center of a screen out of the image signals output from the imaging device, and a second adjusting step for adjusting an aperture amount of the aperture member on the basis of a second part image signal belonging to a second part area assigned to an end of the screen out of the image signals output from the imaging device.

The above described objects and other objects, features, aspects and advantages of the present invention will become more apparent from the following detailed description of the present invention when taken in conjunction with the accompanying drawings.

BEST MODE FOR PRACTICING THE INVENTION

Figure 1:
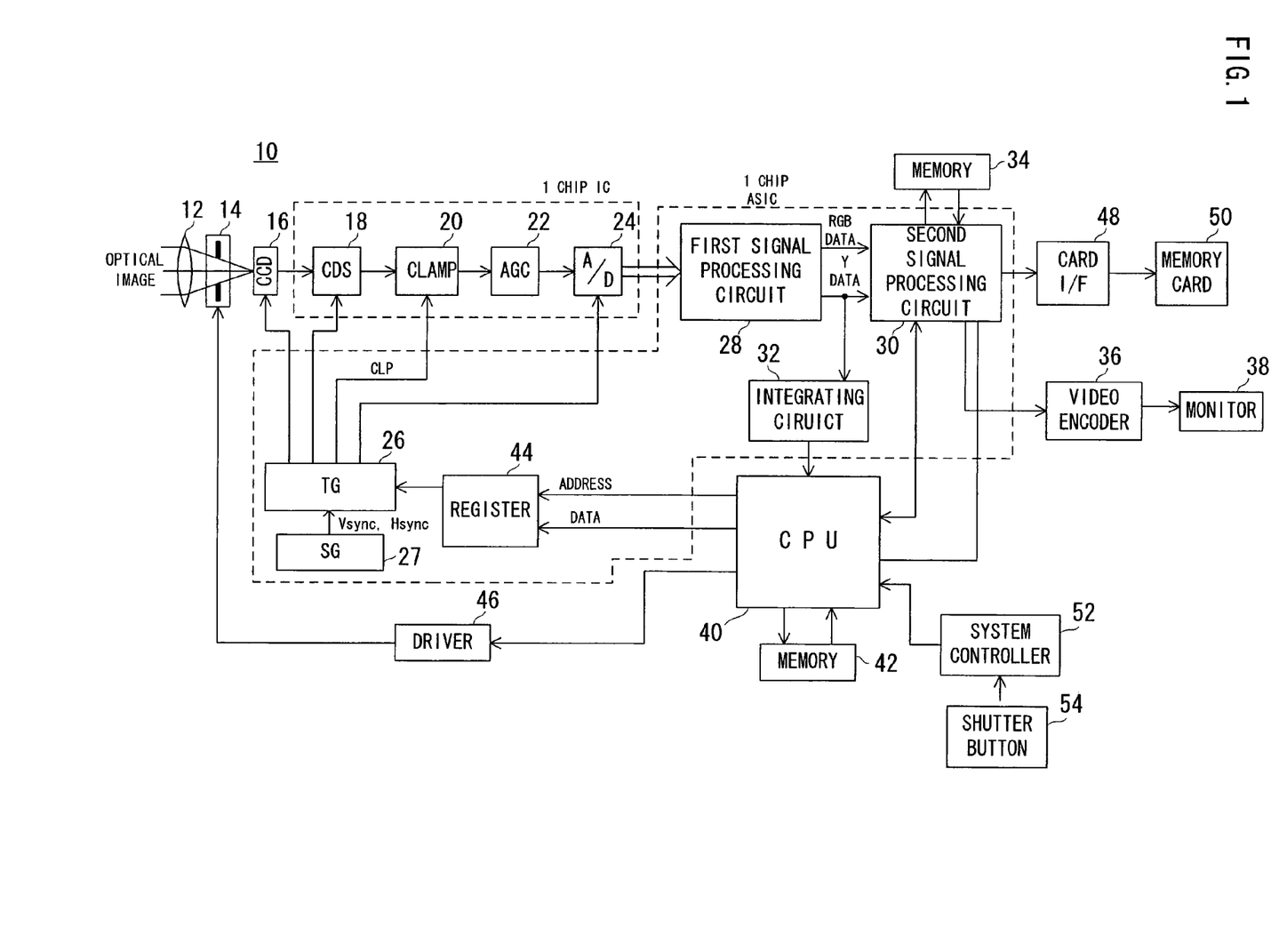
FIG. 1 is a block diagram showing one embodiment of the present invention.

Referring to FIG. 1, a digital camera 10 of this embodiment includes an optical lens 12 and an aperture unit 14. An optical image of an object is irradiated onto a CCD imager 16 through these members. On an acceptance surface of the CCD imager 16, a primary color filter (not illustrated) is attached, and onto each of the photosensors 16a shown in FIG. 2, a light having any one of primary color components is irradiated. The photosensor 16a generates an electric charge (camera signal) in correspondence to an irradiance level by photoelectronic conversion.

A vertical synchronization signal (Vsync) and a horizontal synchronization signal (Hsync) signal are applied to a timing generator (TG) 26 from a signal generator (SG) 27. The TG 26 generates a charge reading pulse, a vertical transfer pulse, a horizontal transfer pulse, and a clamp pulse on the basis of the applied Vsync and Hsync.

Figure 2:
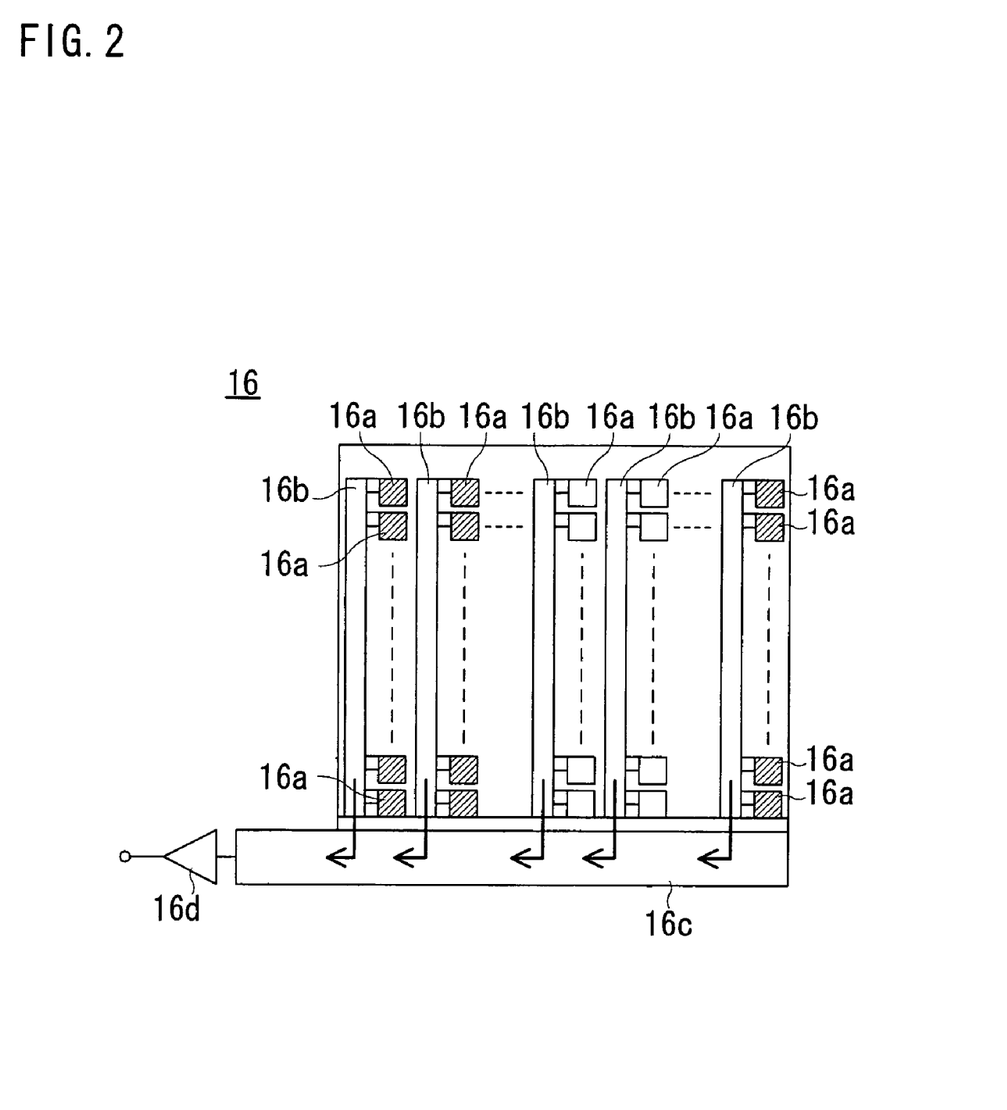
FIG. 2 is an illustrative view showing a configuration of a CCD imager.

The electric charge generated by the photosensor 16a is read by a vertical transfer register 16b in response to the charge reading pulse output from the TG 26. The read electric charge is vertically transferred by the vertical transfer pulse output from the TG 26. The TG 26 also outputs the horizontal transfer pulse every time that an electric charge of a horizontal one line is applied from the vertical transfer register 16b to the horizontal transfer register 16c. The horizontal transfer register 16c horizontally transfers the electric charge of a horizontal one line in response to such a horizontal transfer pulse. The horizontally transferred electric charge is output to the outside through an output circuit 16d. Thus, one screen of the electric charges generated by each of the photosensors 16a is output from the CCD imager 16 in a raster scan manner.

Figure 3:
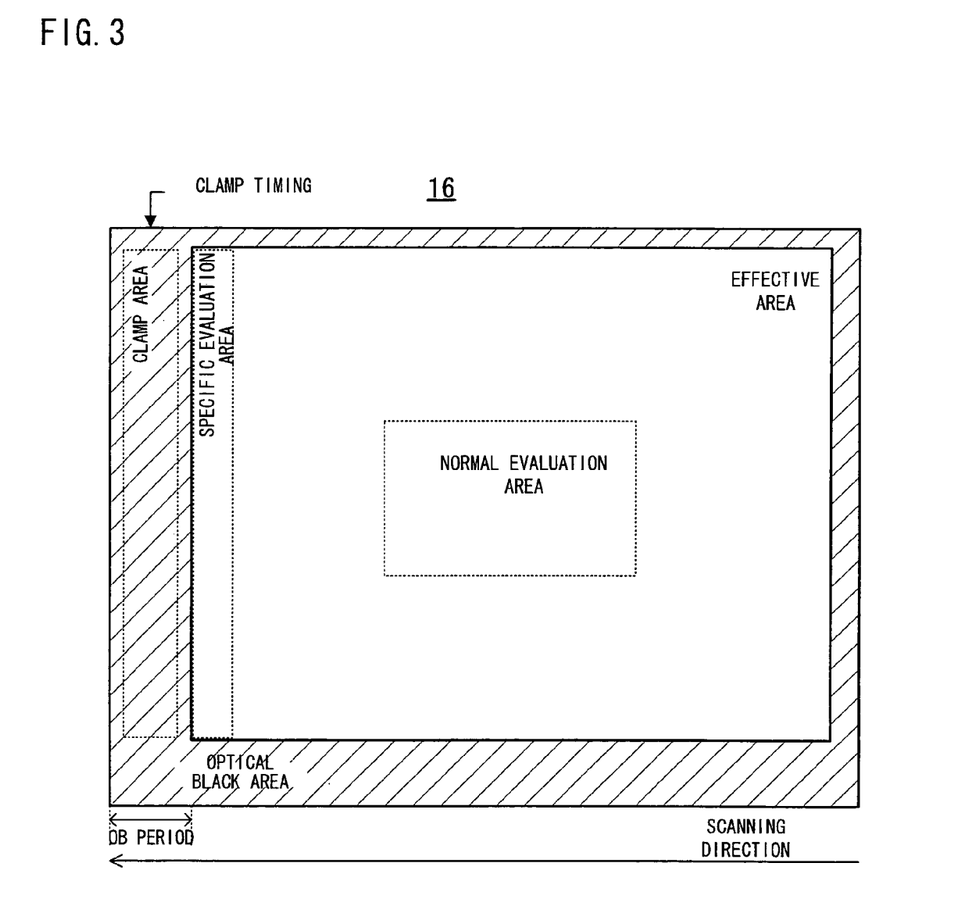
FIG. 3 is an illustrative view showing an acceptance surface of the CCD imager.

The TG 26 generates a horizontal transfer pulse such that camera signals in each line are intermittently output from the CCD imager 16. That is, in order to ensure a horizontal blank period of the camera signal, camera signals in the next line start to be output after a predetermined elapse of time since the output of the camera signals in the current line was completed. Thus, the camera signals output from the CCD imager 16 have an idle feed component between the end of the current line and the top of the next line. Furthermore, on the acceptance surface of the CCD imager 16, an effective area and an optical black area (OPB area) are formed as shown in FIG. 3. The effective area is formed on the center of the acceptance surface, and the optical black area is formed on the periphery of the acceptance surface. Thus, the camera signals output from the CCD imager 16 have an optical black component in addition to the above-described idle feed component.

A camera signal output from the CCD imager 16 is subjected to a correlative double sampling through a process by a CDS circuit 18, and applied to a clamp circuit 20. The clamp circuit 20 clamps the camera signal in response to a clamp pulse output from the TG 26. When a real-time motion image (through-image) is displayed on a monitor 38, the TG 26 generates a clamp pulse CLP. The clamp pulse CLP is output during the optical black period of the camera signal to clamp the camera signal at an optical black level. The camera signal after the clamping process is subjected to a gain adjustment by an AGC circuit 22, and converted into a digital signal (camera data) by an A/D converter 24.

A first signal processing circuit 28 generates RGB data and Y data on the basis of the camera data output from the A/D converter 24, and applies the generated RGB data and Y data to a second signal processing circuit 30. The second signal processing circuit 30 converts the input RGB data and Y data into YUV data, and outputs the converted YUV data to a video encoder 36 via a memory 34. The YUV data is subjected to a predetermined encoding process by the video encoder 36, and then applied to the monitor 38. As a result, a through-image is displayed on the monitor screen.

While photographing such a through image, the Y data output from the first signal processing circuit 28 can also be applied to an integrating circuit 32. The integrating circuit 32 integrates a Y data value to be applied over a predetermined area, and outputs the obtained integral to the CPU 40. An area to be subjected to an integration process by the integrating circuit 32 is placed at two positions including the center and the left end of the effective area as shown in FIG. 3. The former is an area on which a luminance evaluation is performed during a main photographing and a through image photographing, and is called a "normal evaluation area". The latter is an area on which a luminance evaluation is performed during only the through image photographing, and called a "specific evaluation area". The exposure amount adjustment is performed on the basis of an average luminance value of the both areas.

It should be noted that in FIG. 3 example, although approximately one-tenth of the effective area at the center is assigned to the normal evaluation area, the area of the normal evaluation area may be wider or narrower than it. Furthermore, the entire effective area may be assigned to the normal evaluation area. The shape is not limited to a rectangle, and take various shapes such as a circle, a regular polygon, a cross, etc. The number is also not limited to one, and the center area and the four areas located in its four directions such as up and down and right and left, for example, can be assigned to the normal evaluation area.

Next, a description is made on the specific evaluation area in detail. Referring to FIG. 3, in the digital camera 10, a clamping process is performed during the optical black (OB) period corresponding to the optical black area existing at the left of the effective area. Therefore, when a high luminance light is irradiated onto an area near the left end of the effective area, that is, when a high luminance object enters an area near the right end of the through screen, a leaking electric charge is directly flowed into the optical black area (clamp area) where a clamp is performed, resulting in hampering a proper clamping process.

Even if a high luminance light is irradiated onto a place away from the normal evaluation area, a luminance value of the normal evaluation area is hardly changed, and therefore, an exposure amount control on the basis of only the average luminance value of the normal evaluation area cannot address it. Here, in this embodiment, the effective area is divided into 16 lines×16 columns (=256 areas), and the first column (=16 areas) at the left end is assigned to be the specific evaluation area. Taking the average luminance of the specific evaluation area into account, an exposure amount control is performed. It should be noted that the number of division of the effective area may be large or small in number. The specific evaluation area needs not to be one column, and may be two columns or more.

More generally, an area adjacent to the clamp area, that is, the optical black area in correspondence to the optical black period during which a clamping process is performed has to be assigned to the specific evaluation area. For example, as to an electronic camera about which a clamping process is performed during the optical black period at the right of the effective area, the right end of the effective area has to be assigned to the specific evaluation area.

Thus, by considering a luminance value of the specific evaluation area at a time of controlling an exposure amount, even if a high luminance object such as sunlight, or the like enters the right end or the left end of the screen, an adequate clamping process can be performed, and therefore, it is possible to prevent saturation from occurring on the through screen.

During photographing of the through image, when a shutter button 54 is depressed, a main photographing is executed. A register 44 holds the exposure time period at a time of photographing of the through image, and the TG 26 makes the CCD imager 16 to perform a pre-exposure over a period according to the exposure time data held in the register 44. At this time, the aperture amount of the aperture unit 14 is maintained at an amount set at a time of the through image photographing.

The TG 26 also generates a clamp pulse CLP at timing when the optical black component of a camera signal generated by the pre-exposure is input to the clamp circuit 20, and the clamp circuit 20 clamps the camera signal at an optical black level on the basis of the generated clamp pulse CLP. The first signal processing circuit 28 generates Y data on the basis of the clamped camera signal. The generated Y data is integrated by the integrating circuit 32 over a normal evaluation area, and whereby the average luminance value of the normal evaluation area is obtained.

The CPU 40 fetches an average luminance value from the integrating circuit 32, writes the fetched value to the memory 42, and calculates an optimum aperture amount and an optimum exposure time on the basis of the average luminance value. Then, the aperture amount data indicative of the calculation result is informed to the driver 46, and the exposure time data indicative of the calculation result is set to the register 44. The driver 46 adjusts an aperture amount of the aperture unit 14 according to the notified content.

After completion of the update of the exposure time period and the adjustment of the aperture amount, the TG 26 performs a primary exposure according to the optimum exposure time data set to the register 44, and applies a clamp pulse CLP to the clamp circuit 20. The camera signal generated through the primary exposure is clamped by the clamp circuit 20 at the optical black level. The clamped camera signal is converted into camera data through an AGC process by the AGC circuit 22, and is processed in a manner similar to the above description by the first signal processing circuit 28 and the second signal processing circuit 30. As a result, the YUV data based on the primary exposure is generated, and the generated YUV data is recorded on a memory card 50 via a card I/F 48.

Figure 4:
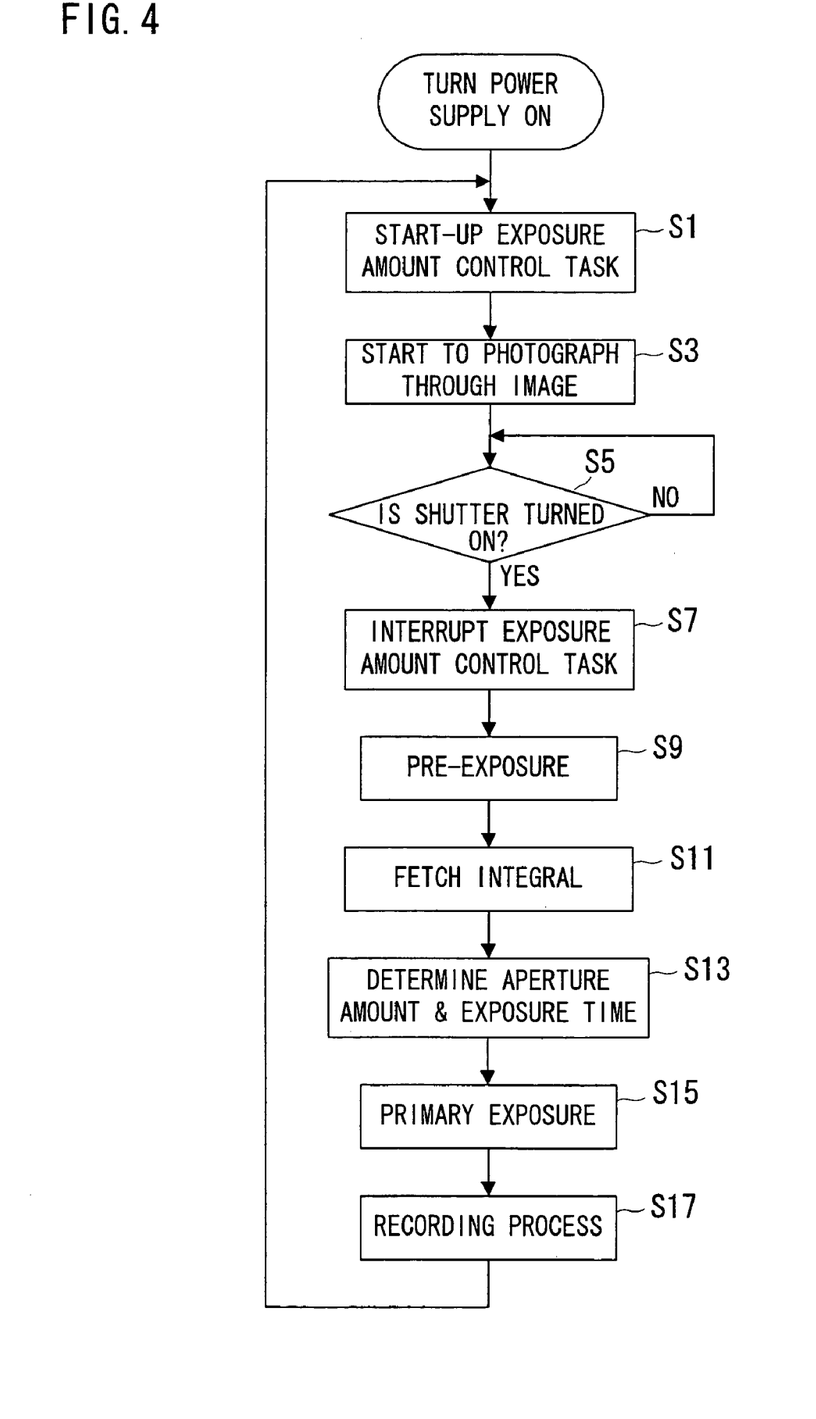
FIG. 4 is a flowchart showing a part of an operation of a CPU.
Figure 5:
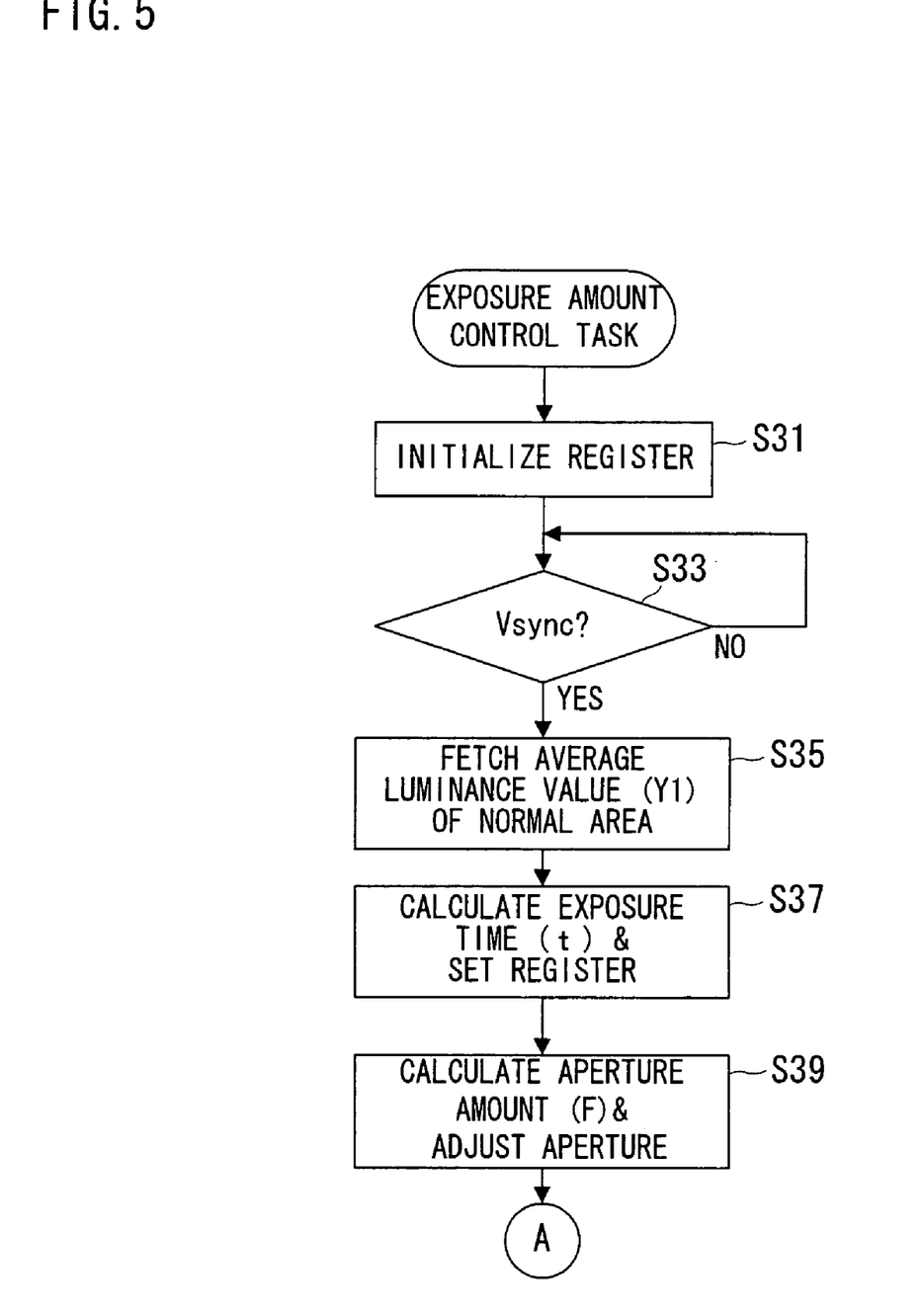
FIG. 5 is a flowchart showing another part of the operation of the CPU.
Figure 6:
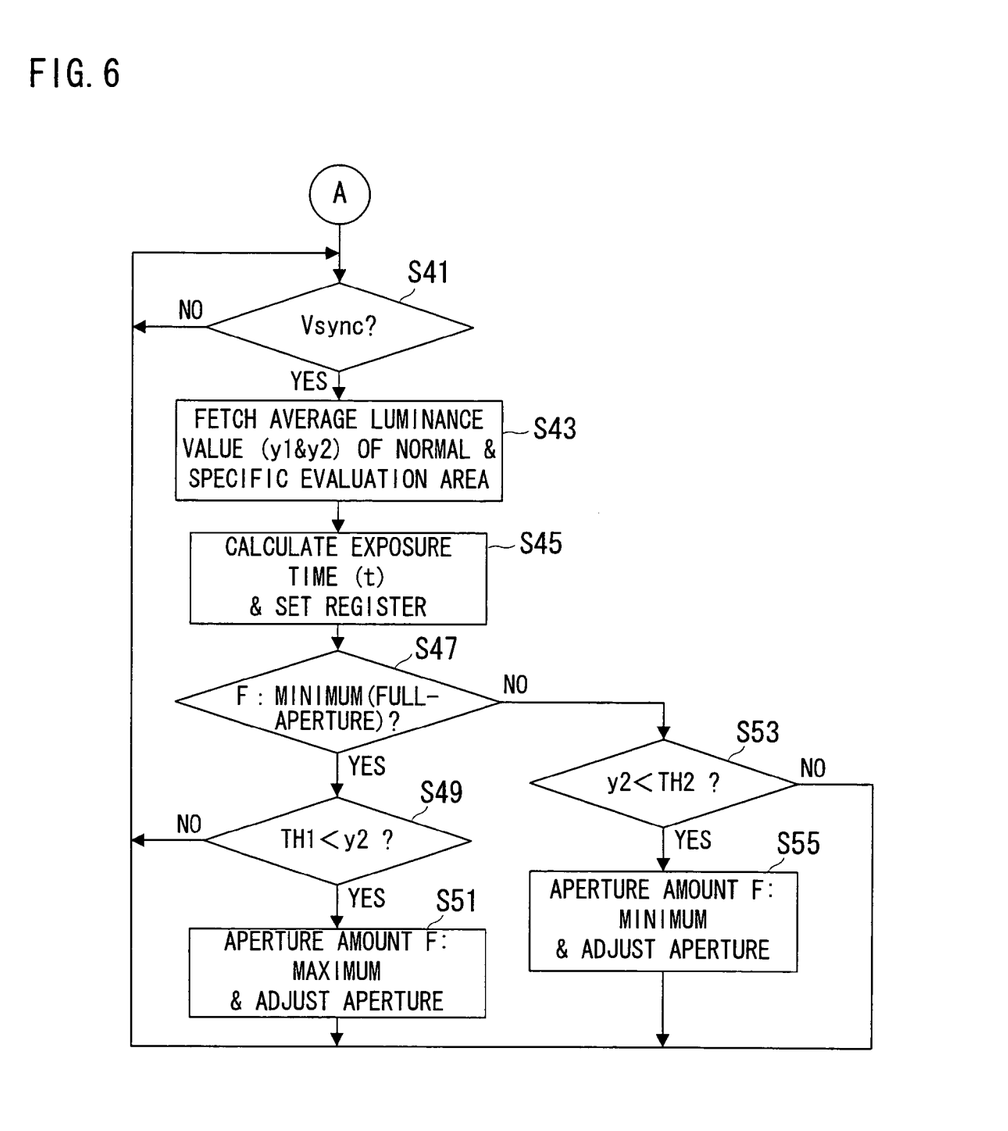
FIG. 6 is a flowchart showing the other part of the operation of the CPU.

In performing the above-described through image photographing and main image photographing, the CPU 40 specifically executes in parallel a main task shown in FIG. 4 and an exposure amount control task shown in FIG. 5 and FIG. 6. It should be noted that the programs corresponding to these tasks are stored in the memory 42. Furthermore, these tasks are executed under control of a multitasking OS such as μITRON, etc.

Referring to FIG. 4, when a power source of the digital camera 10 is turned on, the CPU 40 first starts-up an exposure amount control task (to be described later) in a step S1, and issues a through image start instruction in a next step S3. In response to the instruction, the TG 26 starts to output a pulse, and the CCD imager 16, the CDS circuit 18, the clamp circuit 20, and the A/D converter 24 respectively perform a camera signal reading process, a sampling process, a clamping process, and an A/D conversion process according to a pulse periodically output from the TG 26. As a result, camera data is periodically output from the A/D converter 24.

The first signal processing circuit 28 generates RGB data and Y data on the basis of the camera data from the A/D converter 24, and the second signal processing circuit 30 converts the RGB data and the Y data from the A/D converter 24 into YUV data. The video encoder 36 performs an encoding process on the YUV data from the second signal processing circuit 30, and the monitor 38 displays a through-image on the monitor screen on the basis of the encoded YUV data from the video encoder 36.

During such a through image photographing, the Y data generated by the first signal processing circuit 28 is integrated over each of the normal evaluation area and the specific evaluation area by the integrating circuit 32 to thereby obtain an average luminance value y1 of the normal evaluation area and an average luminance value y2 of the specific evaluation area. Then, by the exposure amount control task, an aperture amount of the aperture unit 14 and an exposure time period of the CCD imager 16 are controlled according to the average luminance values y1 and y2.

In a step S5, the CPU 40 determines whether or not the shutter button 54 is depressed. If the shutter button 54 is not depressed, a standby state is held, and if it is depressed, the process proceeds to a step S7 to interrupt the exposure amount control task, and a pre-exposure executing instruction is issued in a step S9.

The register 44 holds an exposure time period set at a time of the through image photographing, and a pre-exposure is performed on the basis of the value held in the register 44. That is, the TG 26 causes the CCD imager 16 to perform the pre-exposure for a period according to the exposure time data held in the register 44. In the pre-exposure, the aperture amount of the aperture unit 14 is held at an amount set in the through image display.

The TG 26 further generates a clamp pulse CLP at a timing when the optical black component of the camera signal generated by the pre-exposure is input to the clamp circuit 20. The clamp circuit 20 clamps the camera signal at an optical black level on the basis of the generated clamp pulse CLP, and the first signal processing circuit 28 generates Y data on the basis of the clamped camera signal. The generated Y data is integrated over a normal evaluation area by the integrating circuit 32 to thereby obtain an average luminance value of the normal evaluation area.

The CPU 40 fetches such an average luminance value in a step S11, and writes the fetched value to the memory 42. In a succeeding step S13, the optimum aperture amount and the optimum exposure time are calculated on the basis of the average luminance value. Then, the aperture amount data indicative of the calculation result is informed to the driver 46, and the exposure time data indicative of the calculation result is set to the register 44. The value held in the register 44 is updated by the exposure time period calculated anew, and the driver 46 adjusts the aperture amount of the aperture unit 14 according to the informed content.

After completion of an update of the exposure time period and an adjustment of the aperture amount, the CPU 40 proceeds to a step S15 to issue a primary exposure executing instruction. In response thereto, the TG 26 performs a primary exposure according to the optical exposure time data set to the register 44, and applies a clamp pulse CLP to the clamp circuit 20. The camera signal generated by the primary exposure is clamped at the optical black level by the clamp circuit 20. The clamped camera signal is converted into camera data through AGC conversion by the AGC circuit 22, and the output is then subjected to a process similar to the above description at the first signal processing circuit 28 and the second signal processing circuit 30. As a result, YUV data based on the primary exposure is generated.

In a succeeding step S17, the CPU 40 issues a recording instruction, and then returns to the step S1 to restart a through image display. In response to the recording instruction, the second signal processing circuit 30 performs JPEG compression on the generated YUV data. The card I/F 48 records the compressed YUV data on the memory card 50.

The exposure amount control task in the above-described step S3 is executed according to the flowchart shown in FIG. 5 and FIG. 6. Referring to FIG. 5, in a step S31, the CPU 40 first initializes a set value of the register 44, and then proceeds to a step S33 to detect a Vsync. If the Vsync is not detected, a standby state is held, and if detected, the process proceeds to a step S35 to fetch the average luminance value y1 of the normal evaluation area obtained through the first through exposure from the integrating circuit 32. Then, processes in steps step S37 and S39 are executed on the basis of the fetched average luminance value y1.

In the step S37, the CPU 40 calculates a temporal exposure time on the basis of the average luminance value y1, and sets the exposure time data indicative of the calculation result to the register 44. That is, the set value t set to the register 44, that is, the initial value is updated by the temporal exposure time calculated anew. In the step S39, the optimum aperture amount is calculated on the basis of the average luminance value y1, and informs the driver 46 of the calculation result indicative of the aperture amount data F. The driver 46 adjusts the aperture amount of the aperture unit 14 according to the informed content. In this embodiment, the aperture amount is set to any one of the minimum (full aperture) and the maximum.

Thus, after the temporal exposure time is set to the TG 26, and the aperture amount of the aperture unit 14 is adjusted to the optimum value, a second through exposure process is performed in response to a pulse from the TG 26.

Referring to FIG. 6, after completion of the update of the exposure time period and the adjustment of the aperture amount, the CPU 40 proceeds to a step S41 to detect a Vsync again. If a Vsync is not detected, a standby state is held, and if detected, the process shifts to a step S43 to fetch the average luminance values y1 and y2 of the normal evaluation area and the specific evaluation area from the integrating circuit 32.

In a succeeding step S45, the optimum exposure time is calculated on the basis of the fetched average luminance value y1, and the exposure time data indicative of the calculation result is set to the register 44. That is, the set value t in the register 44, that is, the temporal exposure time is updated by the optimum exposure time calculated anew. At this time, the aperture unit 14 remains to be the optimum aperture amount adjusted in the step S39.

After the optimum exposure time is thus set to the TG 26, a third through exposure process is performed in response to a pulse from the TG 26. In a step S47, the CPU 40 determines whether or not the current aperture amount F is minimum, that is, whether or not the aperture unit 14 is in a full-aperture state. As a result of the determination, if the aperture amount F is minimum, the process proceeds to a step S49 to determine whether or not the average luminance value y2 of the specific evaluation area fetched in the step S43 is larger than a threshold value TH1. If the determination result is negative, the process returns to the step S41, and if it is affirmative, the process proceeds to a step S51 to change the aperture amount F from the minimum to the maximum, and issues an aperture adjustment executing instruction. In response to the instruction, the driver 46 drives the aperture unit 14 in such a direction as to close it. After completion of the instruction, the CPU 40 returns to the step S41.

If it is determined that aperture amount F is maximum in the step S47, the process proceeds to a step S53 to determine whether or not the average luminance value y2 in the specific evaluation area is smaller than the threshold value TH2 (noted that TH2<TH1). If the determination result is negative, the process returns to the step S41, and if it is affirmative, the process proceeds to a step S55 to change the aperture amount F from the maximum to the minimum, and to issue an aperture adjustment executing instruction. In response to an instruction, the driver 46 drives the aperture unit 14 in such a direction as to open it. After completion of issuing the instruction, the CPU 40 returns to the step S41.

Thereafter, the process in the steps S41-S55 is repeated until the shutter button 54 is depressed. That is, during the through image photographing, the exposure time period is controlled on the basis of the average luminance value y1 of the normal evaluation area, and the aperture amount is controlled on the basis of the average luminance value y2 of the specific evaluation area.

As understood from the above description, according to this embodiment, during photographing a through image, since an aperture amount control is performed on the basis of the average luminance value y2 of the specific evaluation area corresponding to the right end (or left end) of the screen, it is possible to prevent a flow of leakage charge into the clamp area when a high luminance object enters the right end of the screen (or left end). Therefore, it is possible to perform a precise clamping process on an image signal during a through image display, and prevent saturation on the through screen from occurring. Furthermore, since an exposure time period is controlled on the basis of the average luminance value y2 of the normal evaluation area corresponding to the center of the screen, it is possible to conform to changes of the brightness of a main object.

It should be noted that if the aperture amount is increased, the screen naturally becomes dark, but the luminance at the center of the screen is less lowered than that at the end of the screen. By focusing attention on this point, in this embodiment, changes of the brightness of the main object is addressed by adjusting the exposure time period, and entry of a high luminance object to the end of the object scene is addressed by adjusting the aperture amount. Due to this, it is possible to perform both of an adequate exposure amount control depending on the brightness of the main object and a luminance control of the incident light to the end of the screen.

It should be noted that, in this embodiment, although an area which is on the effective area and is adjacent to the clamp area is assigned to the specific evaluation area, the clamp area may be assigned to the specific evaluation area. An area cuts across the effective area and the clamp area may be assigned to the specific evaluation area. In addition, if the end of the screen is assigned to the specific evaluation area, without considering discrimination between the effective area and the clamp area, it is thus possible to prevent a flow of leakage charge into the clamp area from occurring.

In addition, in this embodiment, the integrating circuit 32 integrates the Y data output from the first signal processing circuit 28 over each of the normal evaluation area and the specific evaluation area, and informs the CPU 40 of the obtained average luminance values y1 and y2. However, the integrating circuit 32 may perform integration on each of 256 areas comprising the effective area, and inform the CPU 40 of the 256 integrals thus obtained. In this case, the CPU 40 calculates the average luminance values y1 and y2 on the basis of the informed 256 integrals.

Furthermore, in this embodiment, in a main photographing by the shutter operation, a camera signal is clamped at the optical black level. However, a camera signal may be clamped at each of the optical black level and the idle feed level. In this case, an average luminance value is obtained as to the image signal which is generated by a first pre-exposure and clamped at the optical black period, and furthermore, an average luminance value is obtained as to the image signal which is generated by a second pre-exposure and clamped at the idle feed period. Then, the exposure amount is adjusted on the basis of the difference between the respective luminance evaluating values. Or, the clamp period is set to any one of the optical black period and the idle feed period on the basis of the difference between the respective luminance evaluating values.

Furthermore, in this embodiment, although the CCD imager 16 is utilized as an image pick-up device, a CMOS-type image sensor may also be utilized.

In the above description, a description is made on a digital camera about which a through-image is output during an interim of the main photographing, that is, a digital camera for photographing both of the motion images and the still images, the present invention can be applied to a digital camera for motion image. Furthermore, even in a digital camera for still image, when a shutter is depressed, since a primary exposure is performed after a pre-exposure more than one is performed, the present invention is applicable. In addition, an electronic camera electronically controlling an exposure amount can be applied irrespective of a digital form or an analog form.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An electronic camera, comprising:
an imaging device for outputting an image signal corresponding to an optical image;
an aperture member for restricting an incident light amount to said imaging device;
a first adjustment means for adjusting an exposure time period of said imaging device on the basis of a first part image signal belonging to a first part area assigned to a center of a screen out of the image signals output from said imaging device; and
a second adjustment means for adjusting an aperture amount of said aperture member on the basis of a second part image signal belonging to a second part area assigned to an end of the screen out of the image signals output from said imaging device.

2. An electronic camera according to claim 1, wherein
said imaging device periodically outputs said image signals,
said first adjustment means adjusts a next exposure time period on the basis of the first part image signal included in the image signals currently output from said imaging device, and
said second adjustment means adjusts a next aperture amount on the basis of the second part image signal included in the image signals currently output from said imaging device.

3. An electronic camera according to claim 1 or 2, further comprising an evaluation means for evaluating brightness of the end of the screen on the basis of said second part image signal, wherein
said second adjustment means includes a comparison means for comparing an evaluated value obtained by said evaluation means with a threshold value, and an adjustment execution means for adjusting said aperture amount on the basis of a comparison result of said comparison means.

4. An electronic camera according to claim 3, wherein
said aperture amount indicates any one of a first amount and a second amount having a restricted amount larger than that of said first amount,
said comparison means includes a first determination means for determining whether or not said evaluated value is above a first threshold value when said aperture amount is said first amount, and a second determination means for determining whether or not said evaluated value is below a second threshold value smaller than said first threshold value when said aperture amount is said second amount, and
said adjustment execution means includes a second amount setting means for setting said aperture amount to said second amount when a determination result by said first determination means is affirmative, and a first amount setting means for setting said aperture amount to said first amount when the determination result by said second determination means is affirmative.

5. An electronic camera according to claim 1 or 2, wherein said imaging device has an imaging surface on which an optical black area and an effective area are provided,
said end of the screen is a portion placed on said effective area and adjacent to said optical black area.

6. An electronic camera according to claim 5, further comprising a clamp means for performing a clamping process on an image signal output from said imaging device at a timing corresponding to said optical black area.

7. An exposure control method which is executed by an electronic camera having an imaging device outputting an image signal corresponding to an optical image and an aperture member restricting an incident light amount to said imaging device, comprising:
a first adjusting step for adjusting an exposure time period of said imaging device on the basis of a first part image signal belonging to a first part area assigned to a center of a screen out of the image signals output from said imaging device; and
a second adjusting step for adjusting an aperture amount of said aperture member on the basis of a second part image signal belonging to a second part area assigned to an end of the screen out of the image signals output from said imaging device.

* * * * *